Jan. 15, 1952

W. J. O'BRIEN

2,582,350

RADIO BEACON SYSTEM

Filed Oct. 7, 1946

WILLIAM J. O'BRIEN,
INVENTOR

BY
ATTORNEY

Fig. 7.

WILLIAM J. O'BRIEN,
INVENTOR

Jan. 15, 1952  W. J. O'BRIEN  2,582,350
RADIO BEACON SYSTEM
Filed Oct. 7, 1946  4 Sheets-Sheet 4

INVENTOR
William J. O'Brien

Patented Jan. 15, 1952

2,582,350

UNITED STATES PATENT OFFICE 2,582,350

RADIO BEACON SYSTEM

William J. O'Brien, London, England, assignor to The Decca Record Company, Limited, London, England, a corporation of Great Britain Application October 7, 1946, Serial No. 701,745 In Great Britain June 4, 1941

23 Claims. (Cl. 343—105)

My invention relates to radio beacon systems and has particular reference to an improved radio beacon system which finds particular utility when employed as a navigation aid for aircraft.

This application is a continuation-in-part of my copending application, Serial No. 420,059, filed November 22, 1941, and entitled "Radio Beacon System," now abandoned.

The radio beacon systems in most general use at present are of the equi-signal type and operate to generate a field strength pattern which includes a line along which the signal intensities of two groups of radio transmitters are equal, which line is the "course" defined by the beacon and along which it is intended that the aircraft shall fly.

The signals from the two groups of transmitters are rendered distinguishable by modulating the signals at different audible frequencies or by keying the two groups of transmitters off and on alternately and in a distinguishable time sequence, the presently employed arrangement being that in which one group of transmitters is keyed with the International Morse Code signal for A while the other is alternately keyed N. In either event, the "on course" position of an aircraft is indicated by the reception at the aircraft of signals of equal intensity from the two groups of transmitters, and an "off course" location is indicated by the predominance of one signal over the other.

The equi-signal type of beacon while reasonably satisfactory for commercial peace time aviation, embodies certain disadvantages which impair its utility and dependability and which render it substantially useless for war time use to guide bombers and similar offensive aircraft to their objectives. For example, the flying conditions with respect to the beacon are precisely reversed in war time from what they are in peace time. In peace time the aircraft is piloted along an ever narrowing course-defining zone toward the beacon transmitters, while in war time the aircraft is piloted outwardly from the beacon transmitters along an ever widening course-defining zone. As a result, the "on course" zone must be very narrow and its angularity must be slight in order to insure that an aircraft following such zone will pass over the desired objective. This statement is particularly true when the course to be followed is from four hundred to five hundred miles long.

The equi-signal type of beacon indicates a deviation from the desired course by a proportional difference in amplitude between the two signals and the sensitivity cannot therefore be increased by amplification of the signals. Furthermore, the sensitivity of the signal is low since the difference in signal intensities must be considerable before it is perceptible by the pilot of the aircraft. Also since the indication depends on the relative amplitudes of the two signals, the beacon can be rendered substantially useless by deliberate radio interference produced by the enemy.

It is believed that a radio beacon which is to be used for guiding military aircraft in war time should be so arranged as to permit the compass direction of the "on course" zone to be changed at will so that aircraft may be guided as desired to any selected objective. The presently employed systems do not realize this desideratum since except for extremely small angular changes the course may be shifted only by shifting the geographical location of the beacon transmitters, an obviously unsatisfactory procedure.

It is, therefore, an object of my invention to provide a radio beacon system which employs two or more beacon transmitters operating in synchronism to define an "on course" line for an aircraft and in which the definition of said line is substantially independent of the relative strengths of the signals from the transmitters.

It is also an object of my invention to provide a radio beacon system which operates to produce a field pattern in which a line extending radially outward toward a selective objective is a locus of points of constant phase relation between synchronized signals emitted from two or more beacon transmitters.

It is an additional object of my invention to provide a radio beacon system of the character set forth in the preceding paragraphs which includes means for separately receiving the synchronized signals and means for determining and indicating the phase relation at the location of an aircraft.

It is a still further object of my invention to provide a beacon system of the character previously referred to in which the receiving means includes means for indicating departures of the phase relationship of the two signals from a selected phase relationship.

It is additionally an object of my invention to provide a radio beacon system which operates to produce an unlimited number of "on course" lines extending radially outward in all directions and in which the receiving means include a means for selecting any desired one of said lines as the course to be followed by the aircraft.

It is a still further object of my invention to provide a beacon system of the character previously referred to in which the receiving means includes a means for amplifying the phase difference between the received signals to permit the realization of extremely high sensitivity.

Other objects and advantages of my invention will be apparent from a study of the following specifications, read in connection with the accompanying drawings, wherein.

Figures 1, 2, 3:
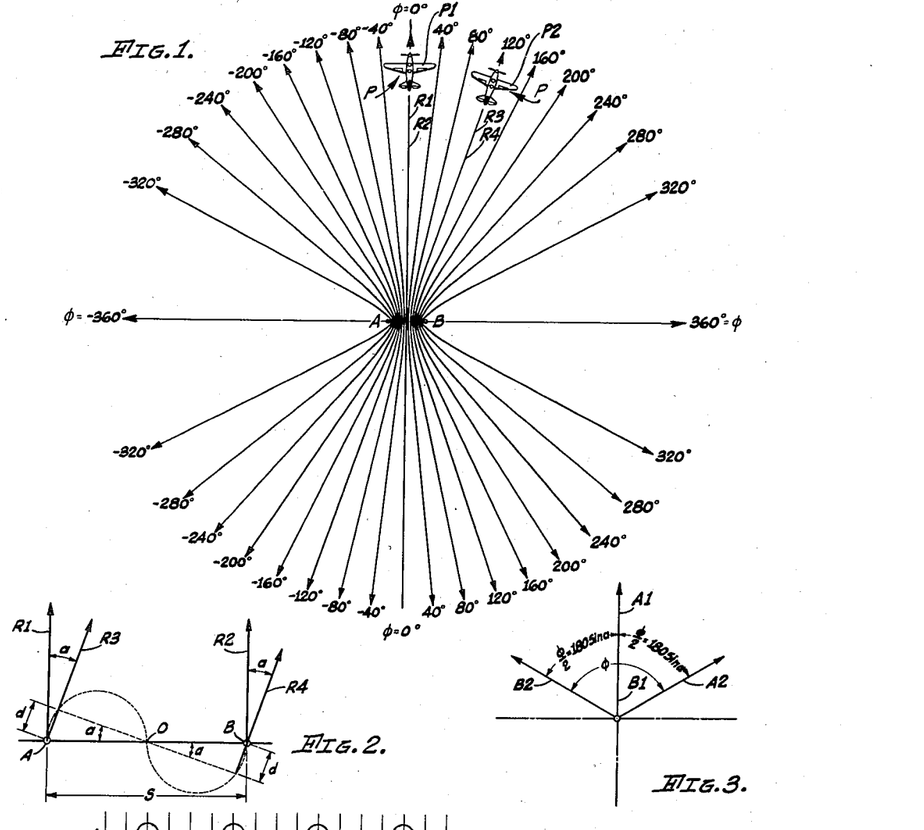
Fig. 1 is a diagrammatic view representing the field pattern produced by two radio transmitters operating in accordance with the beacon system of my invention.
Fig. 2 is a geometrical diagram illustrating the mathematical relationships which define the phase relationship of two signals at a point distant from the transmitters from which said signals are emanated.
Fig. 3 is a vector diagram illustrating the phase relationship of signals emitted by the two transmitters shown in Fig. 1.

Referring to the drawings, I have illustrated in Fig. 1 two radio antennae or other radiators of radio energy. These antennae are identified by reference characters A and B and are indicated as being spaced from each other a distance S (see also Fig. 2). If the antennae A and B are supplied with radio frequency current in such manner as to emit synchronised signals of the same frequency and if the distance S representing the spacing of the antennae A and B is equal to one wavelength, there will be produced a field pattern such as that illustrated by the radial lines shown in Fig. 1.

Each of the radial lines of Fig. 1 represents the locus of all points along which the phase relation at such point between the signals emanated from antennae A and B is constant. The numerical values indicated on Fig. 1 represent the phase relationship between the signals when the distance S is equal to one wavelength and the antennae A and B are operated in phase with each other.

It will be noted by having reference to Fig. 1 that the lines of constant phase relationship are straight except for that portion which is closely adjacent the antennae A and B, these portions being of hyperbolic form. Actually the portions of the lines which have been indicated as straight lines are curved, being legs of hyperbolic curves. These curves, however, so closely approach the asymptotes of the hyperbola that the difference between the hyperbolic curve and the asymptotes is so slight as to be negligible. For example, at a distance exceeding three times the spacing between the antennae A and B the use of the asymptote as the reference line instead of the hyperbolic line introduces an error of less than one-half of one percent, this error being continually smaller as the distance from the antennae A and B is increased.

Referring now to Fig. 2, I have indicated the antennae A and B as being spaced apart a distance identified by the dimension S. I have also indicated parallel lines R1 and R2 as extending respectively, from the antennae A and B. The lines R1 and R2 represent lines drawn from the antennae A and B, respectively, to an aeroplane P, such as the plane P1 illustrated in Fig. 1, situated remote from the antennae A and B. When, as in actual practice, the length of the lines R1 and R2 is large with respect to S, they may be assumed to be parallel without introducing an appreciable error in the calculations. If R1 and R2 are mutually perpendicular to the line joining the antennae A and B, then the lengths of R1 and R2 are equal. Consequently, signals emanated from antennae A and B at a given instant of time will arrive simultaneously at the plane P1 and consequently the phase relationship between the signals received at the aircraft will be the same as the phase relationship between the signals which are emanated from the antennae A and B. If, however, the aircraft be moved in a clockwise direction about the point 0 situated midway between the antennae A and B to a position such as that occupied by plane P2 in Fig. 1 so that the lines R3 and R4 extending, respectively, from the antennae A and B to the aircraft makes an angle $a$ with the lines R1 and R2, the lengths of R3 and R4 will be different. The distance R3 will be increased by an amount indicated by the dimension line $d$ at the left of Fig. 2, whereas, the distance R4 will be decreased from the distance R2 by an amount indicated by the dimension line $d$ at the right of Fig. 2. It will be noted that $$d=\frac{S}{2}\sin a$$

If the distances R3 and R4 are expressed in wavelengths, then $$360\ S\sin a$$

represents the difference in times of arrival of the signals from antennae A and B at the aircraft when this time difference is expressed in electrical degrees. Thus, if $\phi$ is used to represent the phase angle between the signals received at the aircraft and $\theta$ is used to represent the phase relation between the signals emanated from the antennae A and B, then $$\phi=360\ S\sin a\text{ plus }\theta$$

The numerical values assigned to the lines of constant phase difference shown on Fig. 1 represent the values of $\phi$ when $$S=1$$

and $$\theta=0$$

Fig. 3 is a vector diagram illustrating the phase relationship between the signals received at an aeroplane P situated remotely from the antennae A and B under the conditions illustrated in Fig. 1. For example, the two vectors A1 and B1 illustrated as being in phase with each other represent the phase relationships between the signals emanated from the antennae A and B and also represent the phase relationship between signals received by a plane P, such as plane P1, which is proceeding outwardly along a line of zero phase difference (see Fig. 1). Similarly, vectors A2 and B2 illustrate the phase relationship between the signals which are received by a plane P2 proceeding outwardly along the line along which $$\phi = 120°$$

While I have illustrated and described the operation of the antennae A and B under the simple conditions wherein S is equal to one wavelength and $\theta$ equals zero, it will be realized that S may be increased or decreased as desired and, further, that the antennae A and B may be so operated that $\theta$ has a finite value other than zero. The effect of so changing $\theta$ from zero to some other finite value serves merely to assign new values $\phi'$ to the lines representing the selected values of $\phi$ indicated in Fig. 1, these new values $\phi'$ being equal to $$\phi \text{ plus } \theta'$$

where $\theta'$ is the finite value of $\theta$ other than zero. Consequently a change in the value of $\theta$ does not change the shape of the pattern illustrated in Fig. 1 but merely serves to change the value of $\phi$ which is represented by a given line of the pattern. If, however, the distance S be increased, the pattern will be changed in that the lines of constant phase difference indicated on Fig. 1 will be crowded more closely together and additional lines will be added to the pattern. Thus, by increasing the distance S, the rate of change of $\phi$ with respect to the angle $a$ is correspondingly increased so that a greater sensitivity of indication is provided by increasing the spacing distance S.

By equipping the aircraft P with a means for determining the phase relationship between the signals received from antennae A and B and for indicating when those signals are in phase or out of phase, a means is provided which will serve to permit the pilot of the aircraft to guide the plane P1 along the in phase line representing $$\phi = 0$$

It will be realized that in order to ascertain the phase relationship at the location of the plane P, the signals emanated from the antennae A and B must be separately received at the location of the aeroplanes since if the signals are not separately received, the signal which will be received will be merely the vector sum of the separate signals emanated from the antennae A and B.

It will also be realised that where the distance R is extremely large with respect to the distance S, it will be impossible to separately receive the signals emananted from the antennae A and B by employing directional receiving antennae on the plane P. In accordance with my invention, therefore, the antennae A and B are excited at different but harmonically related frequencies so that separate receivers carried by the planes P may be used to separately receive the signals emanated from the antennae A and B.

Figure 8:
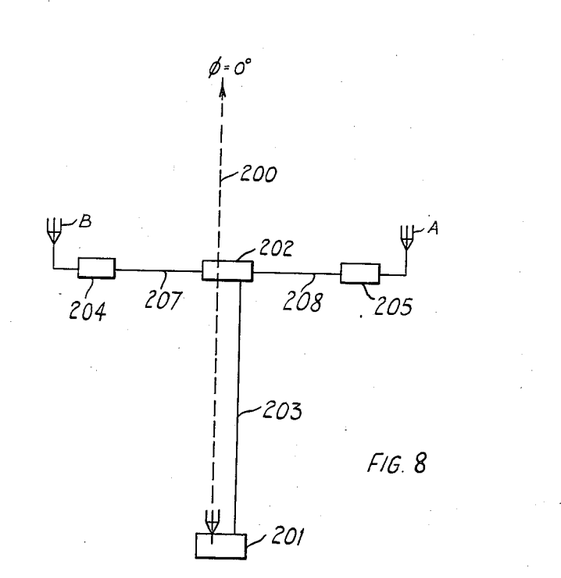
Fig. 8 is a diagram showing the geographical arrangement of the transmitting and control equipment.
Figure 9:
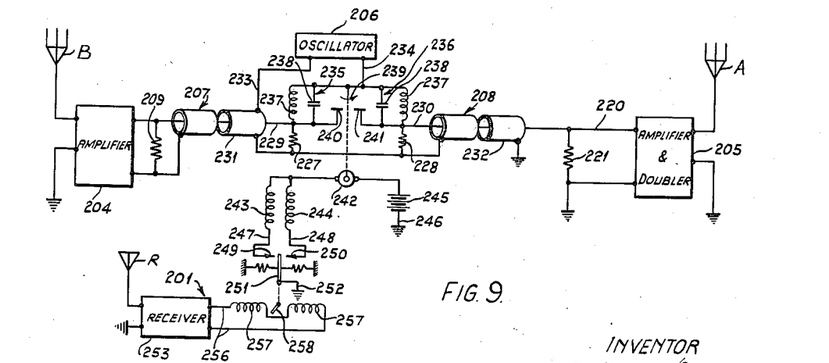
Fig. 9 is a diagram showing the details of the phase control apparatus.

The radio frequency currents which are supplied to the antennae A and B are synchronized with respect to each other and are maintained in a fixed multiple phase relationship to each other. The transmitting apparatus is illustrated in Figs. 8 and 9 and is described hereinafter. I have illustrated in Fig. 4 the manner in which the properly synchronised operation of the antennae A and B may be considered as maintaining a fixed multiple phase relation.

Figure 4:
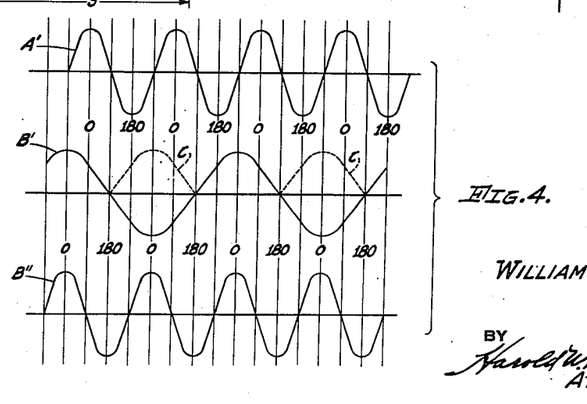
Fig. 4 is a diagrammatic view illustrating the manner in which a fixed phase relationship may be established between two synchronised signals of different but harmonically related frequencies.

In Fig. 4 the sine curve A' may represent the radio frequency current in the antenna A, whereas, the sine curve B' may represent the radio frequency current in antenna B. It will be noted that, as illustrated, the frequency of the current A' is twice that of the current B'. Furthermore, the current B' is illustrated as lagging the current A' by an electrical angle of 90° measured with respect to the frequency of the current A'. This relationship can be readily observed by assuming a full wave rectification of the current B' which serves to invert the negative loops of the sine curve and convert them to positive loops indicated by dotted lines C in Fig. 4. It will be noted that the points of maximum current represented by the curves B' and C lag the points of positive maximum current represented by the current A' by an amount equal to 90 electrical degrees measured with respect to the current A'.

It will be noted that a similar relationship exists between the points of maximum negative current shown on the curve A' and the minimum or zero current appearing on the rectified curve B'—C. Thus the radio frequency current B' while being of one-half the frequency of the current A' may be said to be in a fixed multiple phase relation to the current A' and that this relation can be expressed as a 90° phase difference with respect to the frequency of the current A'.

In Fig. 4 I have indicated by the curve B'' the result of doubling the frequency of the current B'. It will be noted that the current B'' is of the same frequency as the current A' and that it lags the current A' by 90 electrical degrees.

In accordance, therefore, with my invention the antennae A and B are excited at different but harmonically related frequencies and are maintained in multiple phase relationship to each other as described.

While Fig. 4 and the description pertaining thereto has been based on the assumption that antenna B is operated at a frequency precisely equal to one-half the frequency at which antenna A is operated and while the following description of the receiving apparatus is based on the same assumption, it is to be realized that the essential feature is that of operating the antennae A and B in synchronism with each other, at harmonically related frequencies, and in fixed multiple phase relation to each other irrespective of whether the ratio of frequencies at which the antennae A and B is operated is equal to two or some other number. For example, if desired, antenna A can be operated at a frequency of three or four times the frequency at which antenna B is operated.

The aircraft P carries two radio receivers, one tuned to the frequency of antenna A and the other tuned to the frequency of antenna B. One of the receivers includes a frequency doubling stage which serves to convert the received signal B' to the signal B'' of double frequency, which double frequency is then the same as the signal A' received from the antenna A. The separate outputs of the two receivers are then applied to an apparatus which functions to determine and indicate the phase relation between the currents A' and B''. The receivers are so adjusted that an "on course" indication is provided when the plane P1 is proceeding along the line $$\phi = 0$$

Figures 5, 6:
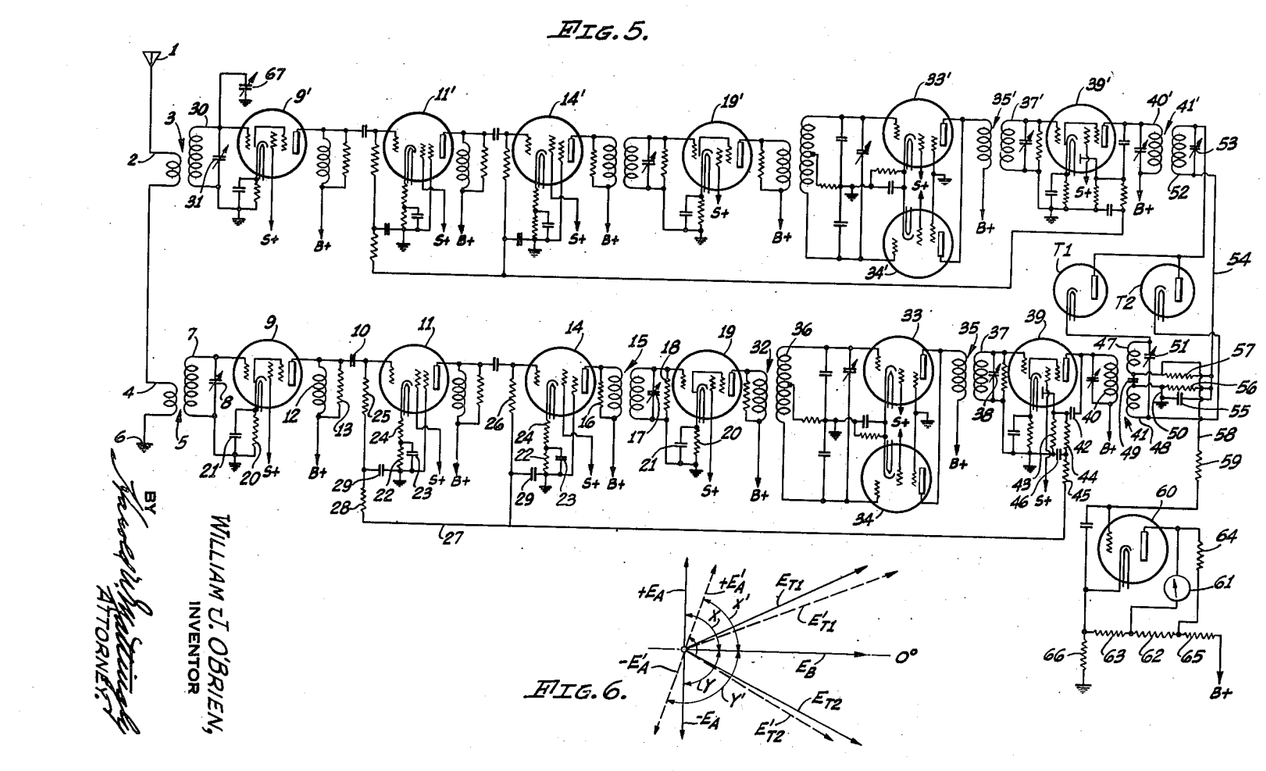
Fig. 5 is a schematic wiring diagram illustrating the equipment and electrical circuits employed in one type of receiving equipment particularly adapted for use with the radio beacon system of my invention.
Fig. 6 is a vector diagram illustrating the operation of that portion of the apparatus illustrated in Figs. 5 and 7 which functions to determine and indicate the phase relationship between two separate signals received by the receiving equipment.

I have illustrated in Fig. 5 one form of receiving equipment adapted to operate in accordance with the preceding description. In Fig. 5 I have omitted the heater circuits for the thermionic tubes employed as well as the circuits for supplying screen and plate potential to the tubes since these circuits form no part of the present invention and since those skilled in this art well know the requirements for satisfactory supply circuits. The screen supply circuits are indicated by an arrow terminating in the legend s+, whereas, the plate supply circuits are similarly indicated by arrows terminating in the legend B+.

The receiving equipment illustrated in Fig. 5 includes an antenna 1 adapted to receive signals emanating from both the antennae A and B, the receiving antenna 1 being connected in series relationship through the primary winding 2 of an input transformer 3 and the primary winding 4 of an input transformer 5, the lower end of the winding 4 being connected to ground as at 6. The input transformer 3 supplies a radio frequency receiver tuned to the frequency of the signals emanated from antenna B, whereas, the input transformer 5 supplies a second radio frequency receiver tuned to the frequency emanated by antenna A.

The input transformer 5 includes a secondary winding 7 which is shunted by a variable condenser 8 permitting the circuit to be tuned to the frequency transmitted by the antenna A. The output of the secondary 7 is applied between the grid and cathode of a thermionic tube 9 whose plate is connected through a coupling condenser 10 to the grid of a subsequent amplifying tube 11. The plate of the tube 9 is connected to B+ through a plate inductance 12 which is preferably shunted by a resistance 13.

The output of the tube 11 is coupled to the input of a tube 14 by an inter-stage coupling similar to that previously described, whereas, the output of the tube 14 is applied to a coupling transformer 15, the primary of which is shunted by a resistance 16 and the secondary of which is tuned as by a condenser 17 shunted by a resistance 18, the voltage developed across the resistance 18 being applied between the grid and cathode of a fourth amplifying tube 19.

Grid bias voltages for the tubes 9 and 19 are preferably developed by means of resistors 20 connected in series with the cathodes of the tubes, these resistors being by-passed in the conventional manner by condensers 21. A portion of the grid bias voltages for the tubes 11 and 14 are similarly developed by cathode resistors 22 by-passed by condensers 23 and also by compensating resistors 24 connected in series between the cathode and the resistors 22 but not provided with by-pass condensers. This form of cathode circuit is employed to maintain phase stability in the stages including tubes 11 and 14 and forms a part of the subject-matter disclosed and claimed in my copending application, Serial No. 405,496, filed August 5, 1941, Patent No. 2,404,809 issued July 30, 1946, and entitled "Compensating Circuit."

The remainder of the grid bias voltage which is applied to tubes 11 and 14 is obtained by connecting the grids of these tubes through grid resistances 25 and 26 to an AVC bus 27 which is supplied with a direct current voltage whose magnitude is caused to vary with the strength of the signal picked up by the antenna 1 in a manner to be hereinafter described. Preferably an isolating resistance 28 is interposed between the resistance 25 and the bus 27 and the lower ends of the resistances 25 and 26 are each preferably by-passed to ground by means of condensers 29.

It will be noted that the tubes 9 and 19 operate at a substantially fixed bias and consequently the amplifying stages embracing these tubes serve to provide a substantially fixed amplification. On the other hand the tubes 11 and 14 are provided with a variable grid bias and consequently operate to provide a variable amplification of the signal. Since variations in the amplification of the tubes 11 and 14 will tend to cause a shift in the phase of the signal amplified by such tubes, the cathode circuit previously referred to is employed to reduce this phase shift to a minimum.

The input transformer 3 previously referred to includes a secondary winding 30 which is tuned by a variable condenser 31 to the frequency emitted by the antenna B, the output of the transformer 3 being applied between the grid and cathode of an amplifying tube 9'.

The output of the tube 9' is fed through tubes 11', 14' and 19', all connected in a manner substantially identical with that previously described in connection with tubes 9, 11, 14 and 19 with the exception that the circuits are tuned to the frequency emanated from the antenna B, whereas, the channel previously described in detail is tuned to the frequency emanated by the antenna A.

In choosing the constants for the various circuit components of the two receivers, the tuning capacities in each channel are preferably made equal, whereas, the inductances employed in the channel for receiving the lower frequency emanated from the antenna B are made four times that which is employed in the high frequency channel for receiving the signals emanating from the antenna A.

The Q of the tuned circuits; that is, the ratio of the reactance to the resistance is so adjusted that the Q for the low frequency channel is half that of the high frequency channel. By adjusting the constants in this manner, the phase shift produced by one channel will be compensated by the phase shift produced in the other channel. A preference is expressed for the use of high inductance and low capacity coupled with a low Q and a low amplification per stage for the purpose of reducing the phase shift which may result from changes in temperature, changes in tube capacities and changes resulting from the variable amplification of the tubes.

Accordingly the plate inductances 12 which are shunted by the resistances 13 and 16 are made of a size sufficient to permit the intercoupled plate and grid circuits to be tuned to resonance by the internal plate to cathode and grid to cathode capacities of the tubes. The Q of the high inductance circuit is reduced by employing the shunt resistances 13 and 16 for the purpose of improving the phase stability of the amplifier. This resistance serves also to broaden the tuning and resort is therefore had to the use of a relatively large number of low gain stages to provide the necessary sharpness of tuning and the necessary amplification. Furthermore, it is desirable to use a relatively low gain per stage since the phase stability in a low gain amplifier is superior to that of a high gain amplifier.

The output of the tube 19 is coupled by means of a coupling transformer 32 to a frequency doubling stage employing tubes 33 and 34, the plates of which are connected in parallel and to the primary of a coupling transformer 35. The frequency doubling circuit employing tubes 33 and 34 is of conventional construction, the grids of the tubes being connected to opposite ends of a center tapped secondary 36 of the transformer 32 so as to be supplied with grid voltages which are out of phase with each other.

The tubes are biased substantially to cut off so that plate current flows in the tubes only during such time as a positive signal is applied to the grids of the tubes. Since the plates of the tubes are in parallel, the fundamental and odd harmonics are rejected, whereas, the even harmonics are applied to the primary of the transformer 35. The second harmonic appears at a much higher amplification than do the higher even harmonics so that by tuning the secondary 37 of the transformer 35 as by means of a condenser 38, the voltage appearing across the winding 37 may be caused to consist almost entirely of the second harmonic which is, of course, a frequency twice that which is applied to the input of the amplifier.

Similarly, the tube 19' is coupled to a frequency quadrupling stage employing thermionic tubes 33' and 34', these tubes being coupled to an output transformer 35' whose secondary 37' is tuned to a frequency four times that which is applied to the input of that amplifier. Thus the transformer secondaries 37 and 37' develop radio frequency voltages of identical frequencies since these voltages are, respectively, two times and four times the frequency emitted by the antennae A and B and since the frequency emitted by antenna A is twice that emitted by antenna B.

These voltages of equal frequency which are developed by the secondaries 37 and 37' are applied, respectively, to amplifier tubes 39 and 39' whose outputs are connected, respectively, to tuned primaries 40 and 40' of output transformers 41 and 41'. Each of the tubes 39 and 39' preferably include also a rectifying circuit for developing the previously mentioned AVC voltage.

The diode element of the tubes 39 and 39' are accordingly connected to the plate of the tube through a condenser 42. The radio frequency voltage is thus applied to the diode element of the tube and serves to produce a rectified current flowing from the diode element to the cathode, from thence to ground and from ground through a diode dropping resistor 43.

The direct current voltage developed across the resistor 43 serves to place the diode element at a negative potential with respect to ground, the magnitude of this potential depending upon the magnitude of the radio frequency voltage which is applied to the diode element. The diode element is, therefore, connected to the AVC bus 27 through resistances 44 and 45, the mid-point of which is connected to ground through a condenser 46, the resistances 44, 45 and the condenser 46 cooperating to exclude radio frequency voltages from the AVC bus 27. Since this bus is connected to the grids of the tubes 11 and 14, the amplification of these tubes is varied in a well understood manner in accordance with the strength of the signal which is developed at the plate of the tube 39. An identical circuit is employed for controlling the tubes 11' and 14' in accordance with the voltage developed by the tube 39'.

The transformer 41 includes two secondary windings 47 and 48 having their adjacent terminals interconnected as by a condenser 49 and grounded as at 50. The opposite terminals of the windings 47 and 48 are connected, respectively, to the cathodes of rectifying tubes T1 and T2. The secondary comprising the windings 47 and 48 may be tuned to the frequency impressed upon the primary 40 as by means of a variable condenser 51.

In a similar manner the transformer 41' includes a secondary winding 52 which is tuned as by a variable condenser 53. One terminal of the winding 52 is connected to ground as by means of a conductor 54 through a condenser 55 and the other terminal is connected to the anodes of the rectifier tubes T1 and T2, which anodes are connected in parallel with each other. A resistance 56 is connected between the conductor 54 and ground and a resistance 57 is connected between the conductor 54 and the inner terminal of the winding 47. This same inner terminal of the winding 47 is also connected as by means of a conductor 58 through a blocking resistance 59 to the grid of a thermionic tube 60.

The circuits just described including the rectifier tubes T1 and T2 operate to apply to the grid of the vacuum tube 60 a direct current potential, the magnitude and polarity of which is a function of the phase relation between the voltages appearing across the transformer secondary windings 47—48 and 52.

The operation of these circuits can best be described by having reference to Fig. 6 by employing the voltage developed across the winding 52 represented by reference character $E_B$ as a reference voltage. The voltage $E_B$ is represented in Fig. 6 by a vector designated by the reference character $E_B$ and disposed in a position representing a phase disposition of zero degrees. If the voltage developed across the winding 47 is in phase quadrature with respect to the voltage developed across the winding 52, then the voltage which is applied to the cathode of the tube T1 with respect to ground may be represented by the vector $+E_A$ and leads the voltage $E_B$ by an angle X equalling 90°. Since the voltage which is applied to the cathode of T2 and generated by the winding 48 must be 180° out of phase with respect to the voltage applied to the cathode T1, the voltage applied to the cathode T2 may be represented by the vector $-E_A$ which lags $E_B$ by an angle Y which equals 90°. Thus the voltage appearing between the anode and cathode of T1 is represented by the vector sum of $+E_A$ and $E_B$, this sum being represented in Fig. 6 by the vector $E_{T1}$. Similarly, the voltage which is applied between the anode and cathode of T2 is the vector sum of $-E_A$ and $E_B$, this resultant being indicated by the vector $E_{T2}$ in Fig. 6.

It will be noted that $E_{T1}$ is equal in magnitude to $E_{T2}$ as long as angle X is equal to angle Y for the reason that $+E_A$ must be always equal and opposite to $-E_A$.

The resistance 57 is connected in the cathode circuit for T1 while the resistance 56 is connected in the cathode circuit for T2. These resistances are of equal magnitude with the result that the voltage drop produced in these resistances by the direct current flowing through the tubes T1 and T2 will be equal. It will be noted that the resistances 56 and 57 are connected in series, the free end of resistance 56 being grounded and the free end of resistance 57 being connected to the conductor 58. Thus the direct current which is caused to flow through the resistances 56 and 57 is caused to flow from the free ends towards the interconnected ends thereof. Thus, with respect to the point of interconnection of the resistances 56 and 57, the grounded end of the resistor 56 and the conductor 58 are both raised to an equal positive potential, so that the voltage of the conductor 58 with respect to ground is zero.

Otherwise stated, since the grounded end of resistance 56 is maintained at a fixed or zero voltage, then the point of interconnection between the resistances 56 and 57 may be said to be depressed to a minus voltage with respect to ground, whereas, the conductor 58 is maintained at ground voltage. Thus, it will be noted that the fact that conductor 58 is at ground potential is indicative of the fact that the voltage developed across the transformer winding 52 is in phase quadrature with respect to the voltage developed across the transformer windings 47—48.

Assuming now that the voltage across the winding 47—48 shifts clockwise with respect to the voltage across the winding 52. The voltage relationships under these circumstances are represented by the dotted vectors in Fig. 6. It will be noted that the potential applied to the cathode of the tube T1 is represented by a vector $+E'_A$ which leads the vector $E_B$ by an angle $X'$ less than 90°. Similarly, the voltage applied to the cathode of T2 is represented by the vector $-E'_A$ which leads $E_B$ by an angle $Y'$ greater than 90°. The resultant voltage which is applied between the anodes and cathodes of the tubes T1 and T2 are indicated, respectively, by the vectors $E'_{T1}$ and $E'_{T2}$. Since the angle $X'$ is less than the angle $Y'$, $E'_{T1}$ will be greater than $E'_{T2}$, with the result that a direct current of greater magnitude will flow through T1 than will flow through T2. The direct current voltage developed across the resistance 57 will exceed the direct current voltage developed across the resistance 56 so that the conductor 58 will be shifted positive with respect to ground.

In a similar manner, if the voltage developed across the transformer winding 47—48 were to be shifted in a counter-clockwise direction from that illustrated by the solid lines in Fig. 6, the conductor 58 would have been shifted negative with respect to ground. Thus, phase quadrature relationship between the output voltage of the tube 39 and the output voltage of the tube 39' is represented by zero voltage on the conductor 58, whereas, a phase angle of greater or less than 90° between the outputs of these two tubes will be represented by a negative or positive voltage being developed between the conductor 58 and ground.

For the purpose of providing a visual indication to the pilot of an aircraft carrying the above described receiving equipment, I employ a sensitive galvanometer 61 which is connected in a bridge circuit to provide an extremely sensitive indication of voltage changes of the conductor 58 with respect to ground. It will be noted that the galvanometer 61 is connected in the position of a balance indicating device in a Wheatstone bridge circuit, one leg of which comprises resistances 62 and 63 and the other leg of which comprises a resistance 64 and the plate to cathode resistance of the tube 60. Voltage for operating the Wheatstone bridge is supplied from B+ through a resistance 65 to the point of interconnection between resistances 62 and 64, the negative return being from the point of interconnection of the cathode of the tube with the resistance 63 and through a resistance 66 to the ground.

The resistances 62, 63, 65 and 66 are so adjusted as to apply a positive potential with respect to ground to the cathode of the tube 60. The grid of the tube 60 being connected to the conductor 58 is normally maintained at ground potential. This serves to bias the tube 60 negatively and the magnitude of this bias is arranged to lie on the straight portion of the grid voltage-plate current characteristic curve of the tube 60. Furthermore, the resistances 62, 63 and 64 are so adjusted with respect to the plate resistance of the tube 60 when the grid thereof is at ground potential as to provide zero voltage across the galvanometer 61.

The galvanometer 61 is preferably a zero center instrument and so maintains its indicating needle at a central position on its dial when the conductor 58 is at ground potential.

If the phase relation between the output of the tubes 39 and 39' shifts from a phase quadrature relationship, the voltage applied to the grid of the tube 60 will be either positive or negative with respect to ground, depending upon the direction of phase shift. This will serve to either decrease or increase the plate to cathode resistance of the tube 60 and will accordingly cause current to flow in one direction or the other through the galvanometer 61. Thus, a deflection of the galvanometer needle in one direction indicates a phase angle of less than 90° between the outputs of the tubes 39 and 39', whereas, a swing of the galvanometer needle to the left indicates a phase angle between the outputs of these tubes of greater than 90°.

Reference has been hereinbefore made to the use of the above described receiving equipment for apprising the pilot of an aircraft carrying the same that he is or is not following the course indicated in Fig. 1 by $$\phi=0$$

In order for the zero center indication of the galvanometer 61 to indicate this condition, it is necessary that the signals which are passed through and amplified by the low frequency channel of the receiver be shifted 90° with respect to the signals which are passed through and amplified by the higher frequency channel of the receiver.

Accordingly, I connect a variable condenser 67 in parallel with the tuning condenser 31 associated with the input transformer 3. Adjustment of the condenser 67 serves, of course, to detune the tuned circuit represented by the winding 30 and condenser 31, but as is well known the phase shift resulting from this detuning far exceeds in magnitude the amplitude effects of the detuning. Thus, phase shifts of from 30 to 45° can be effected by adjustment of the condenser 67 without seriously detuning the circuit 30—31.

It will also be recalled that the signals which are developed across the circuit 30—31 are quadrupled in frequency by the quadrupler 33'—34'. This quadrupling of frequency serves also to quadruple any phase shift which may be effected by the condenser 67 so that in order to shift the output of the tube 39' 90° with respect to the output of the tube 39, it is only necessary to produce a phase shift in the circuit 30—31 of 22½°.

It is desired at this time to point out that while I have described the low frequency channel as being provided with a quadrupler 33'—34', and the high frequency channel as being provided with a frequency doubler 33—34, the frequency doubler may, if desired, be omitted from the high frequency channel and a frequency doubler employed in the low frequency channel instead of the frequency quadrupler. The essential requirement is that the frequency multipliers be so arranged that the signals which are emanated from the antennae A and B be converted into identical frequencies before they are applied to the phase determining apparatus. In this connection it is desired to point out that phase difference between the signals emanated from antennae A and B is multiplied by and to the same extent as the frequency is multiplied by the frequency multipliers employed in the amplifier channels. Thus, by additionally multiplying the frequencies before they are applied to the phase determining apparatus, an increase in sensitivity of the indication may be obtained.

Briefly summarising the operation of the above described equipment, the antennae A and B are supplied with radio frequency currents which are of different but harmonically related frequencies and which are in a fixed multiple phase relation to each other. The energy emanated from antennae A and B is picked up by the antenna 1 and applied to the input transformers 3 and 5. One channel of the receiver operates to receive, amplify and double the high frequency emanated from the antenna A, whereas, the other channel serves to receive, amplify and quadruple the low frequency signals emanated from antenna B. Furthermore, this low frequency channel serves to shift the phase of the received signals 90° with respect to those passed through the other channel so that when the multiple phase relation between the signals from antennae A and B and received by the receiving antenna 1 is $$\phi = 0$$

the output voltages of the two channels will be of identical frequency and in phase quadrature with respect to each other. This, through the action of the rectifiers T1 and T2 and the amplifying tube 60, will serve to provide a center indication on the galvanometer 61.

Should the pilot wander from the line $$\phi = 0$$

the phase relation between the voltages applied to the phase determining portion of the apparatus will be correspondingly shifted and the galvanometer will swing to one side or the other to indicate to the pilot not only that he is "off course," but in which direction he must fly in order to again arrive at the "on course" line $$\phi = 0$$

Thus, the system just described operates to provide for the pilot of an aircraft a continuous indication of his position with respect to the desired course.

It will be further noted particularly by having reference to Fig. 6 and comparing the magnitude of the vectors $-E_A$ and $-E_A$ with the vector $E_B$ that the system is substantially independent of the relative magnitudes of the signals emanated from the antennae A and B and received by the receiving equipment. This makes it substantially impossible to render the beacon useless by deliberate enemy radio interference.

Reference has been made hereinbefore to the desirability of providing a system wherein the course along which the pilot will be guided by the operation of the device can be selected at will. I have illustrated in Fig. 7 a modified form of receiving equipment which is particularly adapted for such operation. The circuit illustrated in Fig. 7 is identical to the circuit illustrated in Fig. 5 with the exceptions which are hereinafter noted.

It will be noted that I have connected the grid and plate of the tube 19' each to ground through variable condensers 68 and 69. These condensers operate in the same manner as has been previously described in connection with the condenser 67 to detune the grid and plate circuits of the tube 19' and thus to produce a phase shift in the signals passed through such circuits. The condensers 68 and 69 are preferably mounted upon a common shaft 70 which carries a pointer 71 adapted to be manually moved over a dial or scale 72.

The scale 72 is preferably marked in values of $\phi$ and the calibration is preferably so arranged that when the pointer 71 is tuned to indicate a predetermined value of $\phi$, the galvanometer 61 will indicate zero when the plane is on the course line along which $\phi$ has that predetermined value. As was previously pointed out in connection with the operation of the condenser 67, the amount of detuning which is effected by the condensers 68 and 69 need be but very little. For example, if the scale 72 is to have an adjustment range of 180°, then the botal phase shift need only be 45° since the phase shift is quadrupled in the quadrupling stage. Since this phase shift is effected simultaneously in the grid circuit and in the plate circuit of the tube 19, each circuit need only be shifted 22½°. This amount of phase shift corresponds to a negligible amount of detuning of these circuits.

Figure 7:
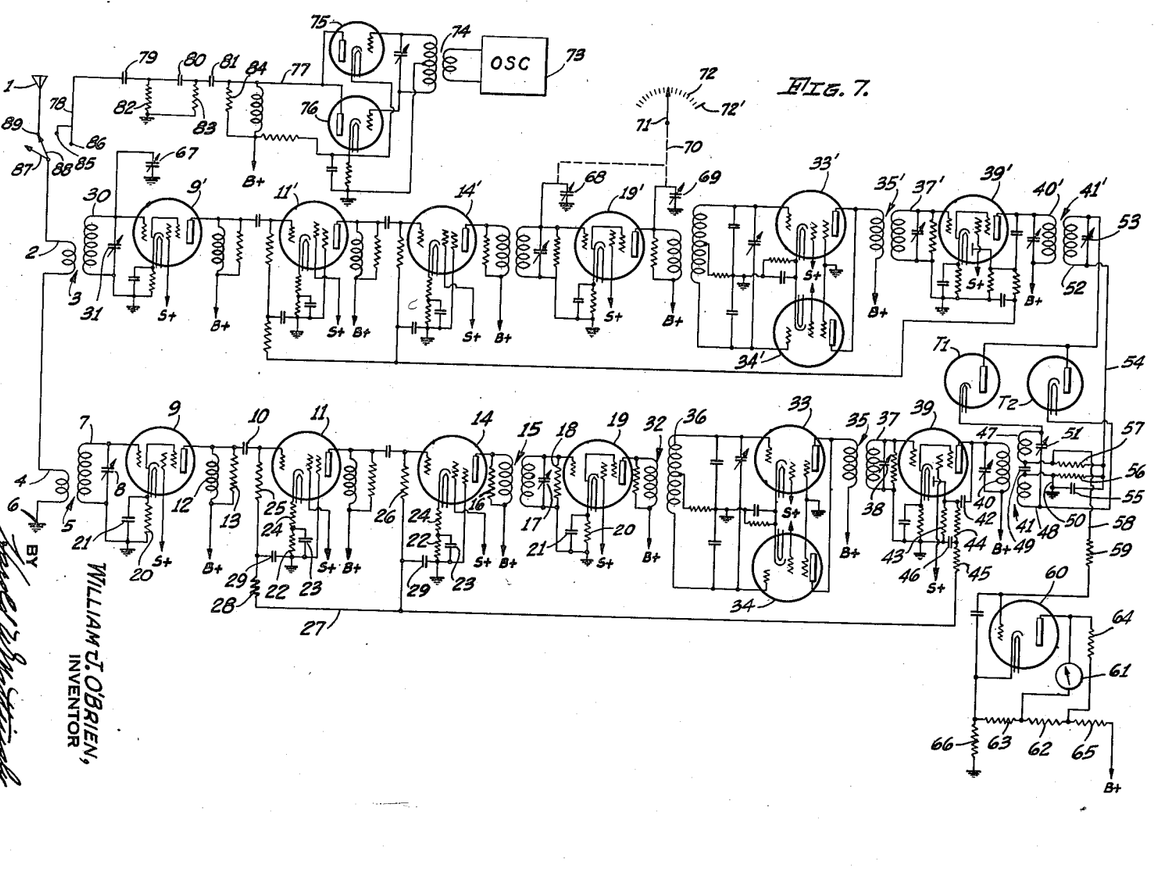
Fig. 7 is a diagram similar to Fig. 5 but illustrating a modified form of receiving equipment.

I have illustrated also in Fig. 7 certain calibrating equipment which may be employed in conjunction with the adjusting condenser 67 to effect such phase adjustment of the receiver as may be necessary to maintain exact correspondence of the reading of the pointer 71 on the scale 72 with the actual value of $\phi$ at which the galvanometer 61 indicates an "on course" condition.

This calibrating equipment preferably includes a suitable high frequency oscillator indicated generally by the rectangle carrying the reference character 73. The output of the oscillator 73 is coupled by means of a transformer 74 to a frequency doubling stage including vacuum tubes 75 and 76. The plates of the tubes 75 and 76 are connected to each other by a conductor 77 and the tubes 75 and 76 are biased substantially at cut off so that the voltage developed on the conductor 77 with respect to ground contains a high percentage of voltages of double the frequency and also four times the frequency which is generated by the oscillator 73.

The conductor 77 is connected to a conductor 78 through a filter arrangement including condensers 79, 80 and 81 and resistances 82, 83 and 84. This filter is adjusted to attenuate the second harmonic to a greater extent than it attenuates the fourth harmonic so that the conductor 78 will be provided with a second harmonic voltage and a fourth harmonic voltage of substantially the same voltage.

The conductor 78 is connected to a pair of stationary switch points 85 and 86 which are adapted to be engaged by a pair of switch arms 87 and 88. The antenna 1 is similarly connected to a switch point 89 while the arms 87 and 88 are connected to the primary windings 2 and 4 of the input transformers 3 and 5 in the manner previously described.

When the switch is in the position illustrated in Fig. 7, the signals picked up by the antenna 1 are, of course, fed to the amplifier in the manner previously described in connection with Fig. 5. When the switch is turned to a position in which the arm 88 contacts the point 85 and the arm 87 contacts the point 89, the voltage on the conductor 89 will be applied to the input of the receiver along with the voltages picked up by the antenna 1.

The frequency at which the oscillator 73 operates is so chosen that the two frequencies appearing on the conductor 78 are substantially equal, respectively, to the frequency emanated by the antennae A and B. Thus, when the output of the oscillator 73 and the antenna 1 are both connected to the receiver, the beat frequency resulting from the mixture of these two sources of energy will be indicated by a fluctuation of the needle of the galvanometer 61. The oscillator frequency is then adjusted to provide a substantially zero beat and the antenna switch is then moved to a third position in which the arm 87 contacts the point 85 and the arm 88 contacts the point 86, thus serving to connect the receiver solely to the output of the oscillator 73. The pointer 71 is then moved to a predetermined point on the scale 72, such as the point marked by the reference character 72'. The adjusting condenser 67 is then adjusted to give an "on course" indication on the galvanometer 61, whereupon the pointer 71 will accurately indicate on the scale 72 those values of $\phi$ at which the galvanometer 61 will give an "on course" indication when the phase relation between the signals received from antennae A and B is represented by that value of $\phi$.

The location of the predetermined scale indication 72' is determined by experiment and is that point at which the represented value of $\phi$ is equal to the fixed phase relation between the two frequencies developed by the oscillator 73 and doubler 75—76 and applied to the conductor 78.

The phase relation between the second and fourth harmonics of the oscillator 73 is a fixed and constant relationship and once determined that phase relationship can be used to determine the location of the calibrating mark 72'. Thereafter, the receiver may, of course, be adjusted to render the readings of the pointer 71 on the scale 72 accurate with respect to the "on course" indications given by the galvanometer 61.

It will, therefore, be observed that I have provided in the apparatus illustrated in Fig. 7 a means whereby the pilot of an aircraft may manually move the pointer 71 to a position on the scale 72 indicating that value of $\phi$ which corresponds to the course desired to be followed by the plane. After this adjustment is made, the galvanometer 61 will operate in the manner described in connection with Fig. 5 to indicate an "on course" location of the plane and also to indicate to the pilot when the plane wanders from the desired course and in what direction it will be necessary to fly the plane in order to bring it back on the desired course.

It will be realized, of course, that for convenience it will probably be preferable to calibrate the scale 72 in terms of the compass direction of the various courses indicated by the field pattern lines illustrated in Fig. 1 so as to avoid the necessity of translating a given compass course into a given value of $\phi$ and then to set the pointer 71 to that value of $\phi$. If the scale 72 is properly calibrated, it may be turned to a point indicating the desired compass direction of the course, at which time the galvanometer 61 will indicate an "on course" condition when the plane is following that compass course.

Reference has been made hereinbefore to the necessity of maintaining fixed the multiple phase relation between the signals radiated from antennae A and B. In Figs. 8 and 9 of the drawings I have illustrated the apparatus which may be employed to so control the transmitting apparatus as to maintain the required multiple phase relationship. As is shown in Fig. 8, the transmitting antennae A and B are spaced apart a predetermined distance and it is desired to so operate these transmitters as to extend the line $$\phi = 0°$$

in a direction perpendicular to the base line joining antennae A and B. Such a line is shown at 200 in Fig. 8.

As a means of so controlling the phase of the transmitters A and B as to hold the line 200 in a fixed orientation, I employ a receiving apparatus as is indicated generally at 201 which is positioned along the line 200 and which is connected to transmitting control apparatus 202, as by means of a transmission line 203. The transmitting control apparatus 202 is employed to actuate and control two transmitters 204 and 205 associated, respectively, with antennae B and A. Transmission lines 207 and 208 may be employed to connect the transmitters 204 and 205 with the control apparatus 202, or if desired suitable radio frequency transmitting and receiving links may be employed in lieu of the metallic transmission lines.

Fig. 9 illustrates in detail the transmitting control apparatus. As shown therein the transmitter 204 may comprise a power amplifier whereas the transmitter 205 may comprise a power amplifier excited from a frequency doubling stage so that the frequency of the signals radiated from antenna A will be twice that of the signals radiated from antenna B. The transmitters 204 and 205 are each arranged to be excited by radio frequency energy developed in a suitable oscillator or similar source represented by a rectangle bearing the reference character 206. The transmission lines 207 and 208 which convey the energy from the oscillator 206 to the amplifiers 204 and 205 may comprise co-axial cables of conventional construction as shown, or may comprise other suitable types of radio frequency transmission lines.

The outlying end of the line 207 is preferably coupled directly to the input of the amplifier 204 as by means of a coupling resistance 209. Similarly a resistance 221 may be employed as the coupling element for connecting the transmission lines 208 to the input of the frequency doubler stage included in the transmitter 205. The resistances 209 and 221 are each preferably made equal to the surge impedance of the transmission lines 207 and 208. In a similar way the input circuit for the transmission lines 207 and 208 may comprise resistances 227 and 228 connected in shunt across the transmission lines between the central conductors 229 and 230 thereof and the outer grounded sheaths 231 and 232 thereof.

The oscillator 206 is coupled to the transmission lines 207 and 208 as by extending one supply conductor 233 into connection with the sheaths 231 and 232 by extending the other supply conductor 234 to the centre conductors 229 and 230 through a pair of identical tank circuits 235 and 236, each including an inductance 237 and a shunt connected condenser 238.

I employ also a phase shifting condenser of the split stator variable type, the movable element 239 thereof being connected to the conductor 234 while one of the stator portions 240 is connected to the conductor 229 and the other stator portion 241 is connected to the conductor 230.

When the movable element 239 occupies a central position, the tuning of the tank circuits 235 and 236 will be identical so that the voltages developed across the resistances 227 and 228 will be in phase with each other. Movement of the movable element 239 will detune the tank circuit 235 in a direction opposite to the detuning of the tank circuit 236, with the result that the phase of the voltage developed across the resistance 227 will shift in one direction, whereas the voltage developed across the resistance 228 will shift in the opposite direction. Thus by properly positioning the movable element 239, it is possible to realize any desired multiple phase relation between the two radio frequency signals emanating from antennae A and B.

In order that the position of the movable element 239 may be automatically controlled to maintain the desired multiple phase relation between the radiated signals, I connect the movable element 239 to a suitable driving mechanism which may, as shown in Fig. 9, comprise a reversible electric motor 242. The motor 242 may be of any suitable reversible type but the one which is illustrated in Fig. 9 comprises a split series field type including series field windings 243 and 244, so arranged that when the motor is energised by power supplied through one of the fields, the direction of rotation will be opposite to that resulting from the application of power through the other field.

One terminal of the motor 242 may be connected to a suitable source of power illustrated in Fig. 9 as comprising a battery 245, the other terminal of which may be connected to ground as at 246. The free end terminal of each of the field windings 243 and 244 is extended by means of control conductors 247 and 248 to left and right hand contacts 249 and 250, respectively, of a control switch which includes a balanced switch arm 251 which is in turn connected to ground as by means of a conductor 252.

The control switch just described is preferably located at or near a receiving apparatus 201 and the control conductors 247 and 248 comprise the control circuit shown diagrammatically at 203 in Fig. 8.

The receiving apparatus which is shown generally at 201 in Figs. 8 and 9 preferably comprises a receiving antenna R located on the line 200 and connected to the input of a receiving apparatus such as has been hereinbefore described with reference to Figs. 5 and 6. In those figures the output of the receiver is shown as being applied to a galvanometer 61 for providing a visual indication of the location of the vehicle with respect to the beacon course. In the control apparatus shown in Fig. 9 the output of the receiver is instead connected as by means of conductors 256 to the coils 257 of a suitable voltage responsive mechanism such as the movement of a galvanometer. This mechanism includes a movable element 258 which is coupled to the movable switch 251 and is so arranged that the member 251 will occupy an intermediate position not engaging either contact 249 or 250 when the line 200 passes directly through the receiving antenna R.

The galvanometer movement 257, 258 is so arranged that if the line 200 shifts to one side of the receiving antenna R the resulting change in the output of the receiver will be such as to cause the balanced switch arm 251 to engage one of the contacts 249 or 250, whereas a movement of the line 200 in the opposite direction will cause the switch arm 251 to engage the other contact.

From the foregoing it will be noted that when the transmitting apparatus is so operating as to extend the line 200 through the receiving antenna R, no voltage will be applied to the motor 242 and the movable condenser element 239 will be stationary. However, in the event there occurs some change in conditions serving to shift the compass direction of the line 200, the changing output of the receiving apparatus will actuate the switching mechanism and energise the motor 242 for rotation in such direction as to so move the movable condenser element 239 as to cause that shift in phase which will shift the compass direction of the line 200 back toward its original position.

While the phase control apparatus has been described with reference to positioning the control receiver along the line 200 with $$\phi = 0°$$

it is to be realised that other phase lines may be used for control by proper adjustment of the receiver as was hereinbefore described with reference to Fig. 7. Thus it will be seen that the control receiver co-acts with the motorised phase shifting equipment to maintain the course defined by the operation of the radio beacon system extended at any desired compass direction irrespective of disturbing influences or extraneous conditions tending to cause a shift of the defined course to a different compass direction.

The transmitting and phase control apparatus disclosed but not claimed herein is disclosed and claimed in my copending application, Serial No. 438,712, filed April 13, 1942, Patent No. 2,449,174 issued September 14, 1948, entitled "Radio Transmitting System" and in a division thereof, Serial No. 509,023, filed November 5, 1943, now abandoned, and entitled "Radio Frequency Transmission System."

From the foregoing it will be observed that I have provided a radio beacon system which operates to generate a field pattern comprising radially outward extending lines comprising the locus of all points of predetermined phase relationship between signals transmitted from two or more antennae.

While I have, in the foregoing, referred to the field pattern as comprising lines of equi-phase relationship, it will be appreciated that these "lines" actually represent a horizontal section of the field, which field is in reality characterized by hyperbolic surfaces, which surfaces comprise alternating electrical equi-phase-displacement surfaces. Where reference has been made hereinbefore to equi-phase "lines," reference is intended to that portion of the equi-phase-displacement surface along which the aircraft or other vehicle is proceeding.

It will be furthermore observed that the system of my invention includes receiving equipment permitting these signals to be separately received and permitting their phase relation to be determined and indicated on an indicating instrument in terms of the position of the plane with respect to the course desired to be followed.

Attention is directed to the fact that the operation of the system is almost entirely independent of relative magnitudes of the signals, thus making it extremely difficult for the enemy to render the system ineffective by means of deliberate radio interference.

It will also be noted that the system of my invention may be used to guide an aircraft in any selected compass direction and that the course to be followed by the plane can be determined by adjustments made solely in the receiving equipment carried by the plane in contra-distinction to the present commercially used equi-signal systems wherein a change in course exceeding 10° or 15° can be effected only by changing the geographical location of the transmitting antennae.

Attention is further directed to the fact that the use of the Wheatstone bridge type of indicating circuit for the galvanometer 61 makes the galvanometer inherently extremely sensitve to changes in output voltage produced by the phase determining portion of the apparatus. This provides for an extremely sensitive indication permitting the pilot of the aircraft to closely follow the desired course.

Furthermore, since the magnitude of the control voltage which is applied to the indicating circuit is determined by the magnitudes of the voltages applied to the rectifier tubes T1 and T2 and the phase relationship between these voltages, it will be seen that additional sensitivity may be obtained by additionally amplifying the signals before they are applied to the rectifier tubes. This result cannot be realized with the equi-signal systems wherein the distinguishing difference between the two received signals is a proportional difference which cannot be altered by an amplification of the signals.

While I have, in the foregoing, referred particularly to the use of the radio beacon system of my invention as a navigation aid for aircraft, it will be realized that the beacon system may be used with equally advantageous results to guide other forms of vehicles or conveyances, whether operated on land or on water.

While I have shown and described the preferred embodiment of my invention, I do not desire to be limited to any of the details of construction shown or described herein, except as defined in the appended claims.

I claim:

1. The method of guiding a vehicle along a selected course which consists in simultaneously radiating from spaced locations synchronised radio waves of different but harmonically related frequencies having a fixed multiple phase relation to each other to define a locus of points of predetermined multiple phase relation between said synchronised waves and coinciding with said selected course, separately receiving at said vehicle the waves from each of said locations, multiplying the frequency of one of said separately received waves to provide two radio frequency signals of identical frequency, comparing the phase of said signals to determine their phase relationship, and indicating departures of said determined phase relation from said predetermined multiple phase relation to indicate departures of said vehicle from said selected course.

2. The method of guiding a vehicle along a selected course which consists in simultaneously radiating from spaced locations synchronised radio waves of different but harmonically related frequencies having a fixed multiple phase relation to each other, separately receiving at said vehicle the waves from each of said locations, multiplying the frequency of one of said separately received waves to provide two radio frequency signals of identical frequency, comparing the phase of said signals to measure their phase relation, determining the multiple phase relation between said radio waves along said course, adjusting the phase relation between said signals in accordance with the determination of said multiple phase relation to produce a predetermined phase relation between said signals when said vehicle is on said course, and thereafter indicating departures of said measured phase relation of said signals from said predetermined phase relation to indicate departures of said vehicle from said selected course.

3. The method of measuring the phase relation between two synchronised radio waves radiated from spaced locations at a point remote from said locations which consists in separately receiving each of said waves, amplifying each of said received waves to provide two radio frequency signals, adding said signals to provide one alternating potential of radio frequency, subtracting one of said signals from the other to provide a second alternating potential of radio frequency, separately rectifying said alternating potentials to provide corresponding direct potentials, and comparing said direct potentials, whereby a measurement of said phase relation is obtained.

4. A radio beacon for aiding the navigation of a vehicle along a selected course which comprises: a geographically fixed radio transmitting system including spaced antennae and means for synchronously radiating from said antennae two radio waves of harmonically related frequencies bearing a fixed multiple phase relation to each other; a pair of radio receivers on said vehicle for separately receiving said waves; frequency multiplying means for at least one of said receivers for producing from said receivers a pair of radio frequency signals of like frequency; means for comparing the phase of said signals to determine their phase relationship; and means for indicating departures of said determined phase relationship from a predetermined phase relation corresponding to said selected course.

5. A device for indicating the phase relationship of two synchronised radio frequency signals of like frequency comprising: a pair of rectifiers each connected in a series circuit with an associated load resistance; a first supply circuit for applying to one of said rectifiers an alternating potential proportional to the vector sum of said signals; a second supply circuit for applying to the other of said rectifiers an alternating potential proportional to the vector difference of said signals; means connecting said load resistances in series in such manner that direct current resulting from rectification of said alternating potentials flows in opposite directions through said resistances; and means for indicating the direct potential across both of said resistances.

6. A radio beacon for aiding the navigation of a vehicle along a selected course which comprises: a geographically fixed radio transmitting system including spaced antennae and means for synchronously radiating from said antennae two radio waves of harmonically related frequencies bearing a fixed multiple phase relation to each other; a pair of radio receivers on said vehicle for separately receiving said waves; frequency multiplying means for at least one of said receivers for producing from said receivers a pair of radio frequency signals of like frequency; means for comparing the phase of said signals to determine their phase relationship; means for indicating departures of said determined phase relation from a predetermined phase relation; and means associated with one of said receivers for shifting the phase of one of said signals with respect to the other of said signals an amount sufficient to bring said predetermined phase relation and said selected course into correspondence with each other.

7. A radio beacon for aiding the navigation of a vehicle along a selected course which comprises: a geographically fixed radio transmitting system including spaced antennae and means for synchronously radiating from said antennae two radio waves of harmonically related frequencies bearing a fixed multiple phase relation to each other; a pair of radio receivers on said vehicle for separately receiving said waves; frequency multiplying means for at least one of said receivers for producing from said receivers a pair of radio frequency signals of like frequency; means for comparing the phase of said signals to determine their phase relationship; means for indicating departures of said determined phase relation from a predetermined phase relation; means associated with one of said receivers for shifting the phase of one of said signals with respect to the other of said signals an amount sufficient to bring said predetermined phase relation and said selected course into correspondence with each other; and means on said vehicle for supplying to said receivers radio waves corresponding in frequency to said radio waves radiated from said spaced antennae and having a known multiple phase relation to each other.

8. A radio beacon for aiding the navigation of a vehicle along a selected course which comprises: a geographically fixed radio transmitting system including spaced antennae and means for synchronously radiating from said antennae two radio waves of harmonically related frequencies bearing a fixed multiple phase relation to each other; a pair of radio receivers on said vehicle connected to a receiving antenna for separately receiving said waves; frequency multiplying means for at least one of said receivers for producing from said receivers a pair of radio frequency signals of like frequency; means for comparing the phase of said signals to determine their phase relationship; means for indicating departures of said determined phase relation from a predetermined phase relation; means associated with one of said receivers for shifting the phase of one of said signals with respect to the other of said signals an amount sufficient to bring said predetermined phase relation and said selected course into correspondence with each other; generator means on said vehicle for supplying to said receivers radio waves corresponding in frequency to said radio waves radiated from said spaced antennae and having a known multiple phase relation to each other; and means for selectively connecting to said receivers said receiving antenna, said generator and both said antenna and said generator.

9. A radio receiver including two channels for separately simultaneously receiving and amplifying two radio waves of different but harmonically related frequencies to produce a pair of output signals, means in one channel for converting the frequency of the wave received thereby to produce an output signal having a frequency identical to the output signal frequency of the other channel, means for altering the phase of one of said output signals relative to the phase of the corresponding radio wave, and means including a non-linear thermionic tube for distinguishably indicating a change in the phase relation between said output signals.

10. An apparatus for comparing the multiple phase relation of two alternating potentials of different but harmonically related frequencies comprising a thermionic amplifying channel for one of said alternating potentials having input and output circuits, a second thermionic amplifying channel for the other of said alternating potentials having corresponding input and output circuits, said corresponding input and output circuits having reactances inversely proportional to the frequencies of said alternating potentials and ratios of reactance to resistance directly proportional to the frequencies of said alternating potentials, means coupled to said output circuits for producing two alternating currents of like frequency corresponding to said alternating potentials, the phase relation between said alternating currents corresponding to the multiple phase relation between said alternating potentials, and a phase discriminating means coupled to said last mentioned means for indicating the phase relation between said like frequency alternating currents.

11. The method of aiding the navigation of a vehicle which consists in radiating radio frequency waves of a given frequency from one location, simultaneously radiating from a second location spaced from said one location radio frequency waves of a frequency harmonically related to said given frequency, maintaining a fixed multiple phase relation between said waves, separately receiving at said vehicle the waves from each of said locations, and continuously determining the instantaneous multiple phase relation between the received waves.

12. The method of guiding a vehicle along a selected course which consists in simultaneously radiating from spaced locations synchronised radio waves of different but harmonically related frequencies, maintaining a fixed multiple phase relation between said waves to define a locus of points of predetermined multiple phase relation between said waves and coinciding with said selected course, separately receiving at said vehicle the waves from each of said locations, comparing said received waves to determine their instantaneous multiple phase relation, and continuously indicating departures of said determined instantaneous multiple phase relation from said predetermined multiple phase relation to indicate departures of said vehicle from said selected course.

13. A radio beacon for aiding the navigation of a vehicle along a selected course which comprises: a geographically fixed radio transmitting system including spaced antennae; means for simultaneously radiating from said antennae two radio waves of different but harmonically related frequencies bearing a fixed multiple phase relation to each other; means on said vehicle for separately receiving said radio waves; and means for continuously indicating departures of said determined instananeous multiple phase relation from a predetermined multiple phase relation corresponding to said selected course.

14. The method of measuring the phase relation between synchronized radio waves of harmonically related frequencies which consists in separately receiving said waves, multiplying the frequency of at least one of said received waves to provide radio frequency signals of like frequency, and continuously determining the instantaneous phase relation between said signals.

15. A device for determining the phase relation of two synchronized radio waves of different but harmonically related frequencies, comprising: two radio frequency receivers each tuned to a different one of said harmonically related frequencies; a frequency multiplier for at least one of said receivers adjusted to produce from said receivers a pair of signals of like frequency; and means for continuously comparing the phase of said signals to determine the instantaneous phase relation thereof.

16. A radio beacon for aiding the navigation of a vehicle along a selected course which comprises: a geographically fixed radio transmitting system including spaced antennae and means for synchronously radiating from said antennae two radio waves of harmonically related frequencies bearing a fixed multiple phase relation to each other; a pair of radio receivers on said vehicle for separately receiving said waves; frequency changing means for at least one of said receivers for producing from said receivers a pair of radio frequency signals of like frequency; means for comparing the phase of said signals to determine their phase relationship; and means for indicating departures of said determined phase relationship from a predetermined phase relation corresponding to said selected course.

17. The method of measuring the phase relation between synchronized radio waves of harmonically related frequencies which consists in separately receiving said waves, changing the frequency of at least one of said received waves to provide radio frequency signals of like frequency, and continuously determining the instantaneous phase relation between said signals.

18. A device for determining the phase relation of two synchronized radio waves of different but harmonically related frequencies, comprising: two radio frequency receivers each tuned to a different one of said harmonically related frequencies; a frequency changer for at least one of said receivers adjusted to produce from said receivers a pair of signals of like frequency; and means for continuously comparing the phase of said signals to determine the instantaneous phase relation thereof.

19. In a radio navigational aid, the combination of: a radio receiver having an input and an output and including two channels for separately simultaneously receiving and amplifying two radio waves of different but harmonically related frequencies; phase measuring means connected to the output of said receiver for continuously determining the instantaneous multiple phase relation between the received waves; generator means associated with said receiver for producing two radio frequency signals corresponding in frequency to said waves and having a known fixed multiple phase relation to each other; manual control means operable to connect said generator means to the input of said receiver; and manual adjustment means coacting with said phase measuring means and operable to vary the multiple phase relation indicated thereby, whereby upon operation of said manual control means said adjustment means may be operated to bring said indicated multiple phase relation into correspondence with said known multiple phase relation.

20. In a radio navigational aid, the combination of: a radio receiver having an input and an output and including two channels for separately simultaneously receiving and amplifying two radio waves of different but harmonically related frequencies; phase measuring means connected to the output of said receiver for continuously determining the instantaneous multiple phase relation between the received waves; manually operable phase shifting means in one of said channels, whereby the operative condition of said receiver and phase measuring means may be verified by observation of a shift in the indicated multiple phase relation resulting from operation of said phase shifting means; generator means associated with said receiver for producing two radio frequency signals corresponding in frequency to said waves and having a known fixed multiple phase relation to each other; manual control means operable to connect said generator means to the input of said receiver; and manual adjustment means coacting with said phase measuring means and operable to vary the multiple phase relation indicated thereby, whereby upon operation of said manual control means said adjustment means may be operated to bring said indicated multiple phase relation into correspondence with said known multiple phase relation.

21. In combination: a first transmitting station for radiating a wave of a given frequency; a relay station spaced from said first station for radiating a wave of a different but harmonically related frequency, both of said waves being derived from a common source; means for establishing a fixed pattern of multiple phase difference in space, said means including a receiver located at a fixed position and receiving signals from both of said stations, means coupled to said receiver for providing a control signal having a value dependent upon the multiple phase relation of the received signals, and a phase control means coacting with at least one of said stations and responsive to said control signal in such sense as to oppose any deviation from a predetermined multiple phase relation between said waves; a mobile receiver comprising a received antenna, a first channel coupled to said antenna for receiving signals of said given frequency, a second channel coupled to said receiving antenna for receiving signals of said different frequency, means for producing from the outputs of said two channels two signals of like frequency, and a phase indicator controlled by said like frequency signals and providing an indication dependent upon the multiple phase relation of the two received signals; generator means at said mobile receiver for generating a distorted signal having standardizing harmonic signal components of said given frequency and of said different frequency, said standardizing harmonic signal components bearing a fixed and known multiple phase relation to each other; switching means for transferring the inputs of said first and second channels from said receiving antenna to said generator means; and a manually adjustable means for adjusting said phase indicator to a predetermined fixed indication when said switching means connects said inputs to said generator means, thus correlating the indications of said phase indicator with said known and fixed multiple phase relation and allowing said indicator to give true indications of the multiple phase relations between the received signals when said switching means connects said inputs to said receiving antenna.

22. In a radio navigational system, the combination of: a pair of spaced transmitting stations for radiating two radio frequency signals of unlike but harmonically related frequencies; a dual channel receiver at a fixed position for separately and simultaneously receiving said signals to produce an output signal from each of said channels, the multiple phase relation between said output signals bearing a fixed relation to the multiple phase relation between the received signals; phase responsive means actuated by both of said output signals for producing a control voltage the magnitude and sign of which is representative of the multiple phase relation between said output signals; a phase change means coacting with at least one of said transmitting stations and operable to vary the multiple phase relation between said radio frequency signals; means coupled to said phase responsive means and responsive to variations of said control voltage for operating said phase change means to maintain a predetermined fixed multiple phase relation between said radio frequency signals; a mobile receiver including means for indicating the difference in the distances of said mobile receiver from said transmitting stations as represented by the difference in the transit times from said stations to said mobile receiver, said last mentioned means including an indicating device for indicating changes in the time phase relation of two input signals of the transmitted frequencies; a receiving antenna; a signal generator for producing a pair of standard signals having the same frequencies as said radio frequency signals and having a known fixed multiple phase relation to each other; manually operable switching means having a first position connecting the input of said mobile receiver to said receiving antenna and having a second position connecting the input of said mobile receiver to said signal generator; and means for adjusting said indicating device to a given indication corresponding to said known fixed multiple phase relation when said switching means is in said second position to thereby insure that the indications given by said indicating device accurately correspond to said differences in the distances from said mobile receiver to said transmitting stations when said switching means is in said first position.

23. In combination: a pair of spaced transmitting stations for radiating signals of unlike but harmonically related frequencies; means for maintaining a fixed multiple phase relation between said radiated signals comprising a receiver responsive to said signals for producing an output current representative of the multiple phase relation between said received signals and a phase shift means coacting with said receiver and at least one of said transmitting stations and responsive to variations of said output current for producing a phase shift in the radiated signal of the opposite sense to that indicated by the variations of said output current; a mobile receiver having an antenna for receiving said signals from said transmitting stations and including two channels for obtaining from the received signals a pair of like frequency output signals; and a phase comparison circuit connected between the outputs of said channels and responsive to said output signals, said phase comparison circuit including a phase indicator for continuously indicating the multiple phase relation of the received signals at said antenna.

WILLIAM J. O'BRIEN.

REFERENCES CITED

The following references are of record in the file of this patent:

UNITED STATES PATENTS

| Number | Name | Date |
|---|---|---|
| 1,907,132 | Thurston | May 2, 1933 |
| 1,934,400 | Bollman | Nov. 7, 1933 |
| 2,408,773 | Goodall | Oct. 8, 1946 |